(12) United States Patent
VanDenberg et al.

(10) Patent No.: US 8,720,922 B2
(45) Date of Patent: May 13, 2014

(54) SUSPENSION SYSTEM WITH SINGLE MOVING ELEMENT

(75) Inventors: Ervin K. VanDenberg, Massillon, OH (US); David H. Croston, Navarre, OH (US)

(73) Assignee: Transportation Technologies, Inc., Massillon, OH (US)

( * ) Notice: Subject to any disclaimer, the term of this patent is extended or adjusted under 35 U.S.C. 154(b) by 0 days.

(21) Appl. No.: 13/605,030

(22) Filed: Sep. 6, 2012

(65) Prior Publication Data

US 2012/0326412 A1  Dec. 27, 2012

Related U.S. Application Data

(63) Continuation-in-part of application No. 12/723,838, filed on Mar. 15, 2010, now Pat. No. 8,328,211.

(60) Provisional application No. 61/171,637, filed on Apr. 22, 2009.

(51) Int. Cl.
  *B60G 11/18* (2006.01)
  *F16B 21/02* (2006.01)

(52) U.S. Cl.
  USPC ............. 280/124.166; 267/273; 280/124.116; 403/348

(58) Field of Classification Search
  USPC ............ 267/256, 273; 280/86.5, 789, 124.11, 280/124.116, 124.125, 124.128–124.132, 280/124.134, 124.151, 124.153, 124.157, 280/124.162, 124.166; 403/348, 349, 383
  See application file for complete search history.

(56) References Cited

U.S. PATENT DOCUMENTS

| | | | | |
|---|---|---|---|---|
| 710,240 | A | * | 9/1902 | Belfield et al. ................ 301/118 |
| 1,403,201 | A | * | 1/1922 | Shaw ............................ 403/348 |
| 2,299,357 | A | * | 10/1942 | Strunk et al. .................. 403/182 |
| 2,998,981 | A | | 9/1961 | Derr |
| 3,661,411 | A | * | 5/1972 | Flick ............................. 403/348 |
| 3,746,363 | A | | 7/1973 | Borns |
| 3,784,221 | A | | 1/1974 | Frasier, Sr. |
| 3,913,939 | A | * | 10/1975 | Sinclair et al. ............ 280/6.159 |
| 3,966,223 | A | | 6/1976 | Carr |
| 4,171,830 | A | | 10/1979 | Metz |
| 4,483,400 | A | * | 11/1984 | Arndt .............................. 172/42 |
| 4,506,910 | A | | 3/1985 | Bierens |
| 4,530,515 | A | | 7/1985 | Raidel |
| 4,878,691 | A | | 11/1989 | Cooper et al. |
| 4,884,790 | A | * | 12/1989 | Castrilli ......................... 267/154 |
| 4,889,361 | A | | 12/1989 | Booher |
| 4,893,832 | A | | 1/1990 | Booher |
| 4,934,733 | A | | 6/1990 | Smith et al. |
| 5,090,495 | A | | 2/1992 | Christenson |
| 5,161,814 | A | | 11/1992 | Walker |

(Continued)

*Primary Examiner* — Ruth Ilan
*Assistant Examiner* — Laura Freedman
(74) *Attorney, Agent, or Firm* — Sand & Sebolt

(57) ABSTRACT

A suspension system for use with a vehicle including an axle tube, an internal tube and a locking structure. The axle tube is adapted to be attached to the vehicle. The internal tube assembly has an inner member with a first end and a second end. A locking structure is formed integrally at the second end with the inner member. The locking structure has a locking shape that allows the internal tube assembly to be inserted into the axle tube when the locking structure is rotated to a non-operational position. The internal tube assembly is prevented from being removed from the axle tube when the internal tube assembly rotates between jounce and rebound positions when the suspension system is operational.

20 Claims, 19 Drawing Sheets

(56) References Cited

U.S. PATENT DOCUMENTS

| | | | |
|---|---|---|---|
| 5,163,701 A * | 11/1992 | Cromley, Jr. | 280/124.13 |
| 5,310,276 A * | 5/1994 | Bergers et al. | 403/349 |
| 5,366,237 A | 11/1994 | Dilling et al. | |
| 5,407,293 A * | 4/1995 | Crainich | 403/322.1 |
| 5,427,404 A | 6/1995 | Stephens | |
| 5,505,481 A | 4/1996 | VanDenberg et al. | |
| 5,505,482 A | 4/1996 | VanDenberg | |
| 5,540,454 A | 7/1996 | VanDenberg et al. | |
| 5,593,265 A * | 1/1997 | Kizer | 411/552 |
| 5,683,098 A | 11/1997 | VanDenberg | |
| 5,690,353 A | 11/1997 | Vandenberg | |
| 5,718,445 A | 2/1998 | VanDenberg | |
| 5,788,263 A | 8/1998 | VanDenberg | |
| 5,820,156 A | 10/1998 | VanDenberg | |
| 5,853,183 A | 12/1998 | VanDenberg | |
| 6,126,359 A * | 10/2000 | Dittrich et al. | 403/349 |
| 6,340,165 B1 | 1/2002 | Kelderman | |
| 6,398,179 B1 * | 6/2002 | Soles | 248/617 |
| 6,398,251 B1 | 6/2002 | Smith | |
| 6,447,073 B1 * | 9/2002 | Goettker | 301/127 |
| 6,550,869 B2 | 4/2003 | Dantele | |
| 6,749,209 B2 | 6/2004 | Davison et al. | |
| 6,921,098 B2 | 7/2005 | VanDenberg et al. | |
| 7,209,038 B1 | 4/2007 | Deconinck et al. | |
| 7,273,117 B2 | 9/2007 | Pond | |
| 7,397,372 B2 | 7/2008 | Perri et al. | |
| 7,464,948 B2 | 12/2008 | Ramsey | |
| 7,497,450 B2 | 3/2009 | Galazin | |
| 7,697,963 B1 | 4/2010 | Pomery | |
| 7,726,674 B2 | 6/2010 | VanDenberg et al. | |
| 7,731,211 B2 | 6/2010 | Ramsey | |
| 7,758,056 B2 | 7/2010 | VanDenberg et al. | |
| 7,980,577 B2 | 7/2011 | Vandenberg et al. | |
| 8,328,211 B2 * | 12/2012 | VanDenberg et al. | 280/124.116 |
| 2005/0082783 A1 | 4/2005 | Ramsey et al. | |
| 2010/0207346 A1 | 8/2010 | Vandenberg et al. | |
| 2010/0264613 A1 | 10/2010 | Vandenberg et al. | |
| 2010/0270769 A1 | 10/2010 | Vandenberg et al. | |

\* cited by examiner

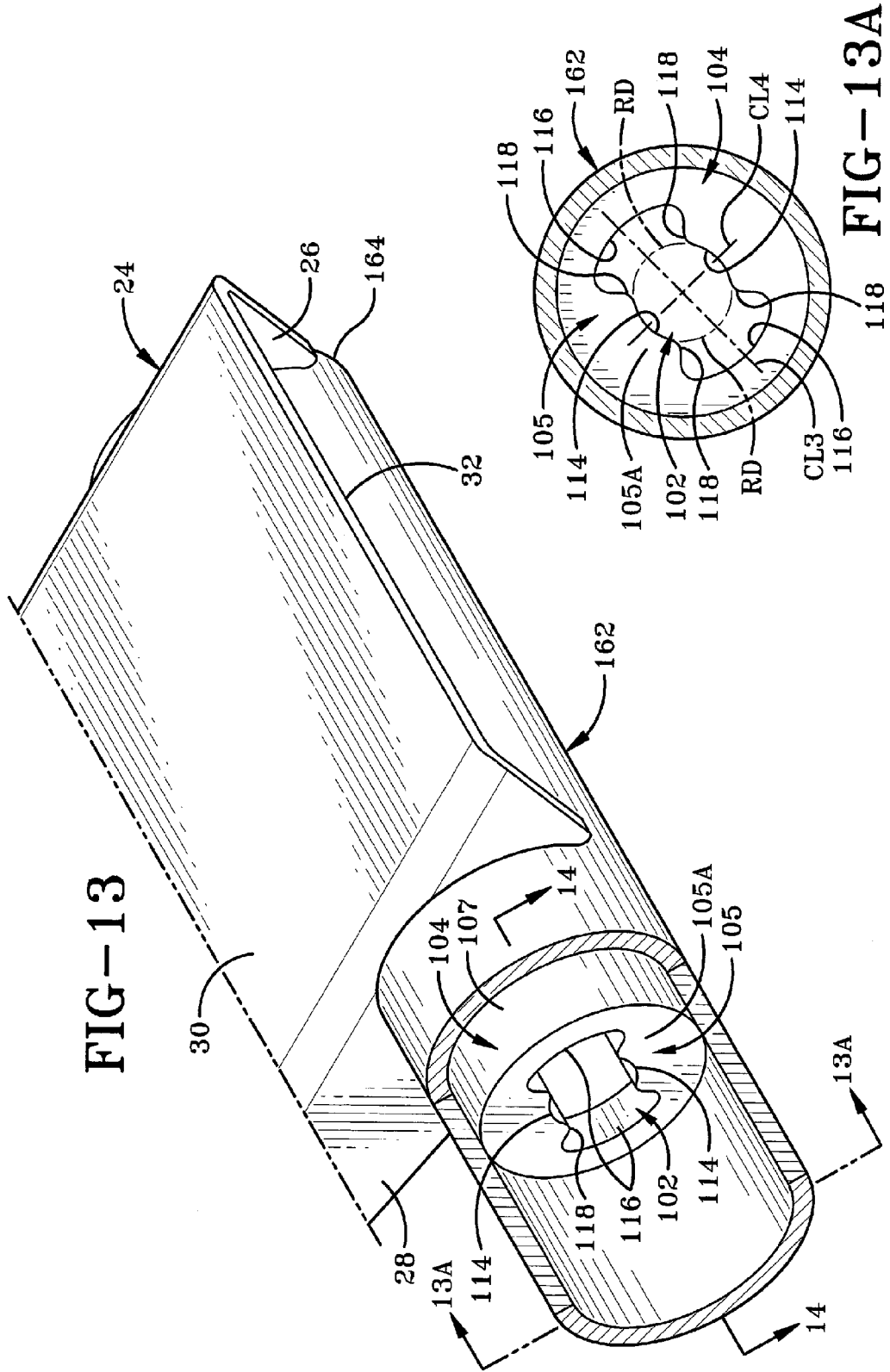

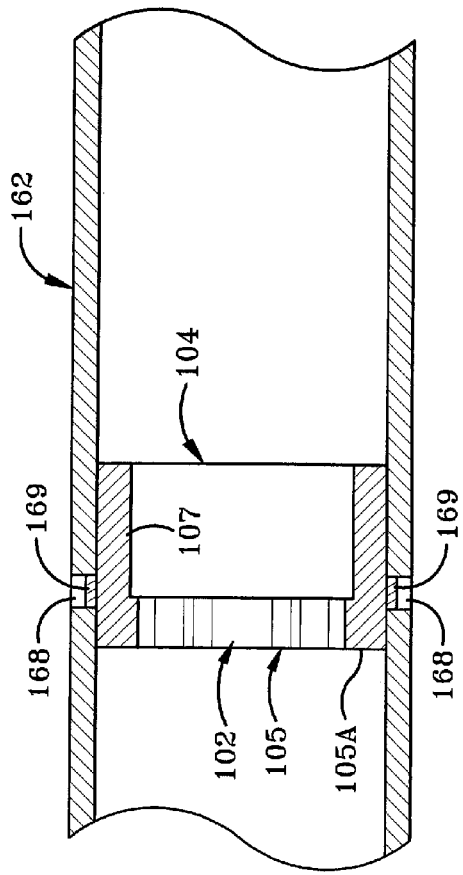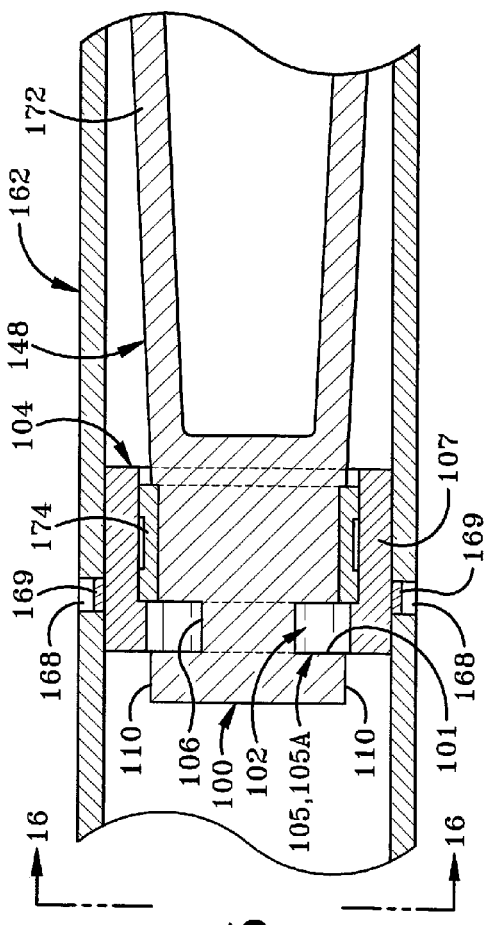

SUSPENSION SYSTEM WITH SINGLE MOVING ELEMENT

CROSS REFERENCE TO RELATED APPLICATION

This application is a continuation-in-part application of U.S. patent application Ser. No. 12/723,838, filed Mar. 15, 2010, which claimed priority from U.S. Provisional Patent Application Ser. No. 61/171,637, filed Apr. 22, 2009; the disclosures of which are incorporated herein by reference.

BACKGROUND OF THE INVENTION

1. Technical Field

The invention relates generally to an improved vehicle suspension system for vehicles such as trailers and trucks. More particularly, the invention relates to an air spring suspension system with a single piece trailing beam for land vehicles. Specifically, the invention relates to a trailing beam air suspension system which provides the advantages of independent wheel suspension with integrated components and a more compact arrangement.

2. Background Information

Torsion axles have been known for many years (for example, as shown in U.S. Pat. No. 2,998,981. Torsion axles have proven to be extremely popular because if one wheel hits a bump or rut it can react independently of the other wheel which may not hit a bump or rut at the same time. This torsion axle concept operates to keep a trailer moving as straight as possible behind a towing vehicle and absorbs some of the shock of the road over which it is passing with an independent suspension. This is contrasted with a straight axle wherein if one wheel drops into a rut or is slowed down for any reason while the other wheel of the trailer does not have the same experience at the same time, the trailer would tend to turn somewhat to allow the wheel that is on the flat part of the road to move forward while the wheel that is in the rut is restrained therefore causing the axle to not be perpendicular with the direction of towing of the vehicle itself.

Most torsion axles are constructed of a square axle in cross-section with elongated rubber members disposed in-between the square axle and a larger outer tube. U.S. Pat. Nos. 5,161,814 and 5,820,156 disclose such a construction. One common torsion axle is a TorFlex® rubber torsion suspension system distributed by Dexter Axle. This type of torsion axle has independent and separate stub axles or stub shafts on each end which are part of spaced suspension assemblies mounting each of the wheels on the trailer frame to enhance the independent aspect of such an axle.

Torsion axles can also be constructed as disclosed in U.S. Pat. No. 5,163,701 which uses a plurality of elongated bars which can twist and bend but return to their original position after such bending. It is also known to use air bags, commonly referred to as air springs, for straight, non-torsion axles, such as those shown in U.S. Pat. Nos. 3,784,221 and 5,427,404. While it is true that both the torsion axle technology and the air spring technology has been quite successful independently in making a smoother ride and enhancing the handling performances of vehicles having such suspension systems, these suspension systems still have their shortcomings and there is a need for improvement thereto.

The vehicle suspension system of U.S. Pat. No. 6,340,165 combines the advantage of both the torsion axle and air spring into a single suspension assembly and has provided a more efficient and better performing suspension system than that provided by the systems using only a torsion axle or only an air spring.

The suspension assembly of the present invention improves upon the prior art and provides a more rugged, compact, and lighter weight suspension by providing a completely independent trailing arm style suspension that still provides superior lateral stability. The present invention also allows the traditional torsion axle to be completely removed and enable lower design heights to be achieved and also requires only a single integrated moving part at each wheel to provide a superior ride quality.

Therefore, a need exists for a trailing arm suspension which is a fully independent wheel suspension and incorporates air springs to improve ride quality.

SUMMARY OF THE INVENTION

The suspension system of the present invention broadly comprises a suspension system for use with a vehicle comprising a control arm having an upper rear arm and a spring mounting plate integrally formed as a single member, a spindle extending outwardly from the upper rear arm, an air spring adapted to be mounted intermediate the spring plate and the vehicle, and a pivot assembly for pivotally mounting the control arm to the vehicle whereby the pivot assembly has a first axis of rotation.

BRIEF DESCRIPTION OF THE DRAWINGS

The preferred embodiments of the invention, illustrative of the best modes in which Applicant has contemplated applying the principles of the invention, are set forth in the following description and are shown in the drawings.

FIG. 13 is a partially opened view of an axle tube for use with the locking structure.

FIG. 13A is an example cross-sectional view taken along line 13A-13A of FIG. 13.

FIG. 14 is an example cross-sectional view of the axial tube without the internal tube assembly installed.

FIG. 15 is an example cross-sectional view taken along line 16-16 of FIG. 17.

Similar reference numbers in different figures refer to similar components.

DESCRIPTION OF THE PREFERRED EMBODIMENTS

Figure 1:
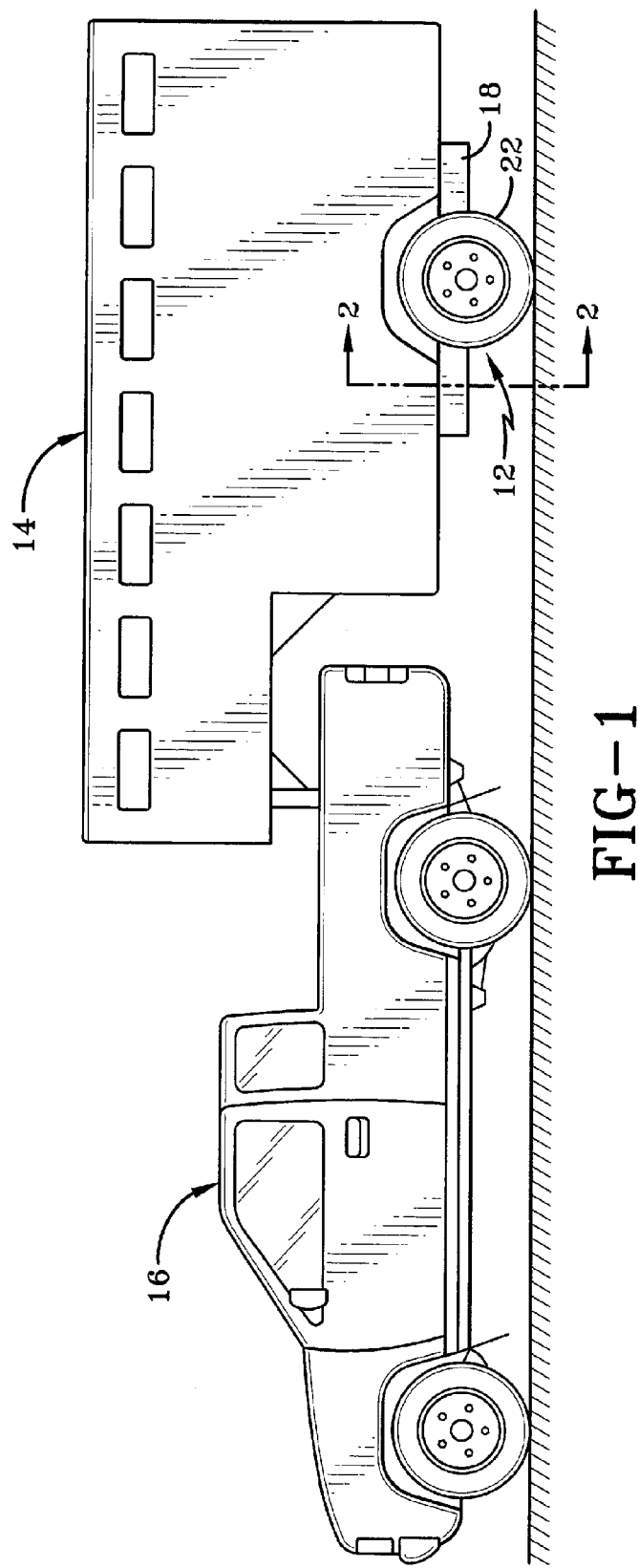
FIG. 1 is a side view of a truck towing a trailer having a preferred embodiment suspension system.
Figure 2:
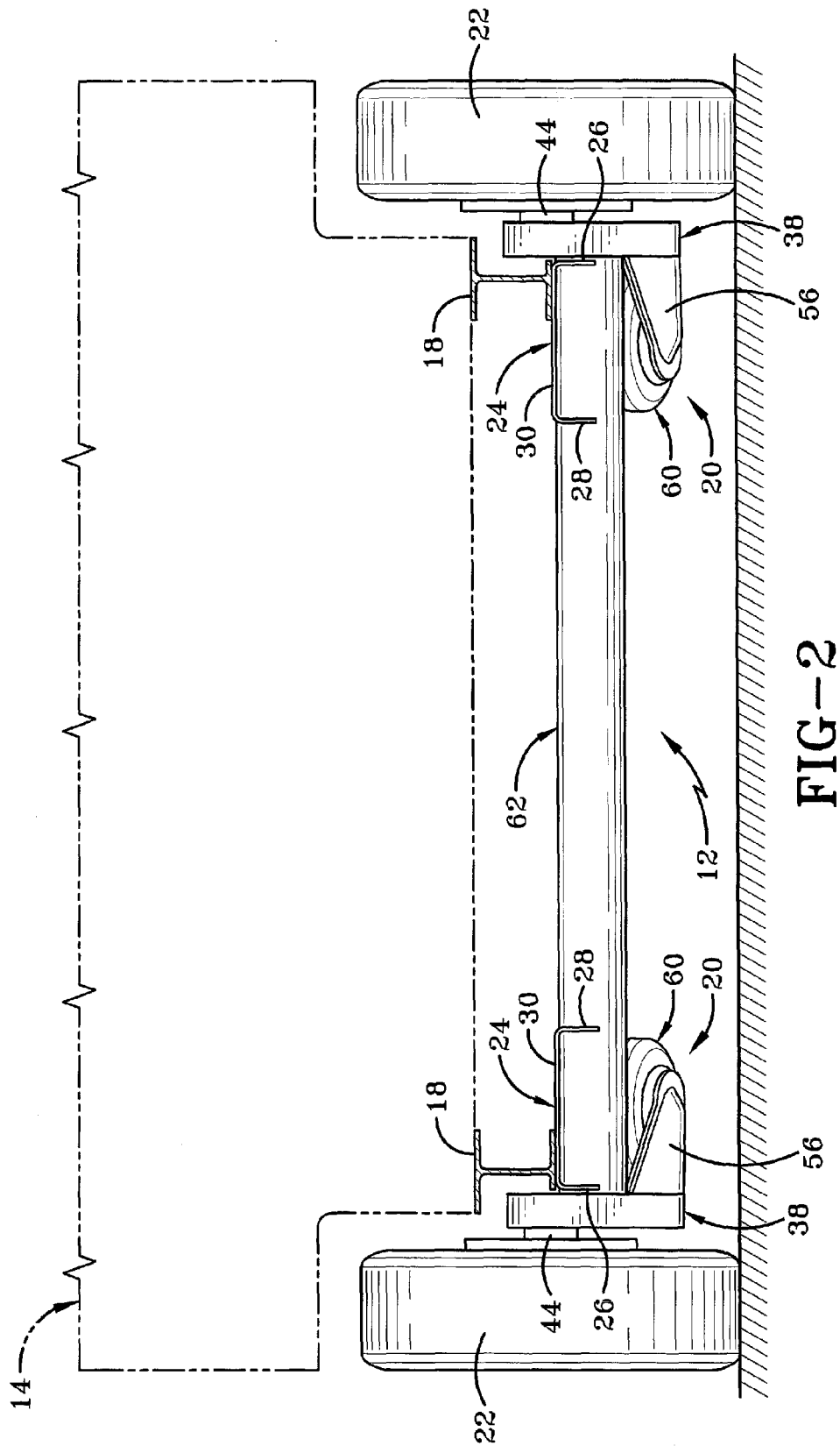
FIG. 2 is a front view of a suspension system of the preferred embodiment with a vehicle body attached to the frame and shown in dot-dash lines.

At the outset, it should be appreciated that like drawing numbers on different drawing views identify identical, or functionally similar structural elements of the invention. While the present invention is described with respect to what is presently considered to be the preferred embodiment, it is to be understood that the invention as claimed is not limited to the disclosed aspects.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

The vehicle suspension system of the present invention is indicated generally at 12, as is particularly shown in FIGS. 1 through 10 mounted on a vehicle 14, such as a trailer of the type being towed by a truck 16. Averting to FIG. 2, trailer 14 is supported on a pair of frame rails 18 extending longitudinally along the length of the trailer. A pair of the improved suspension assemblies, each indicated generally at 20, are mounted on a respective frame rail 18 each generally adjacent a tire-wheel assembly 22.

Figure 4:
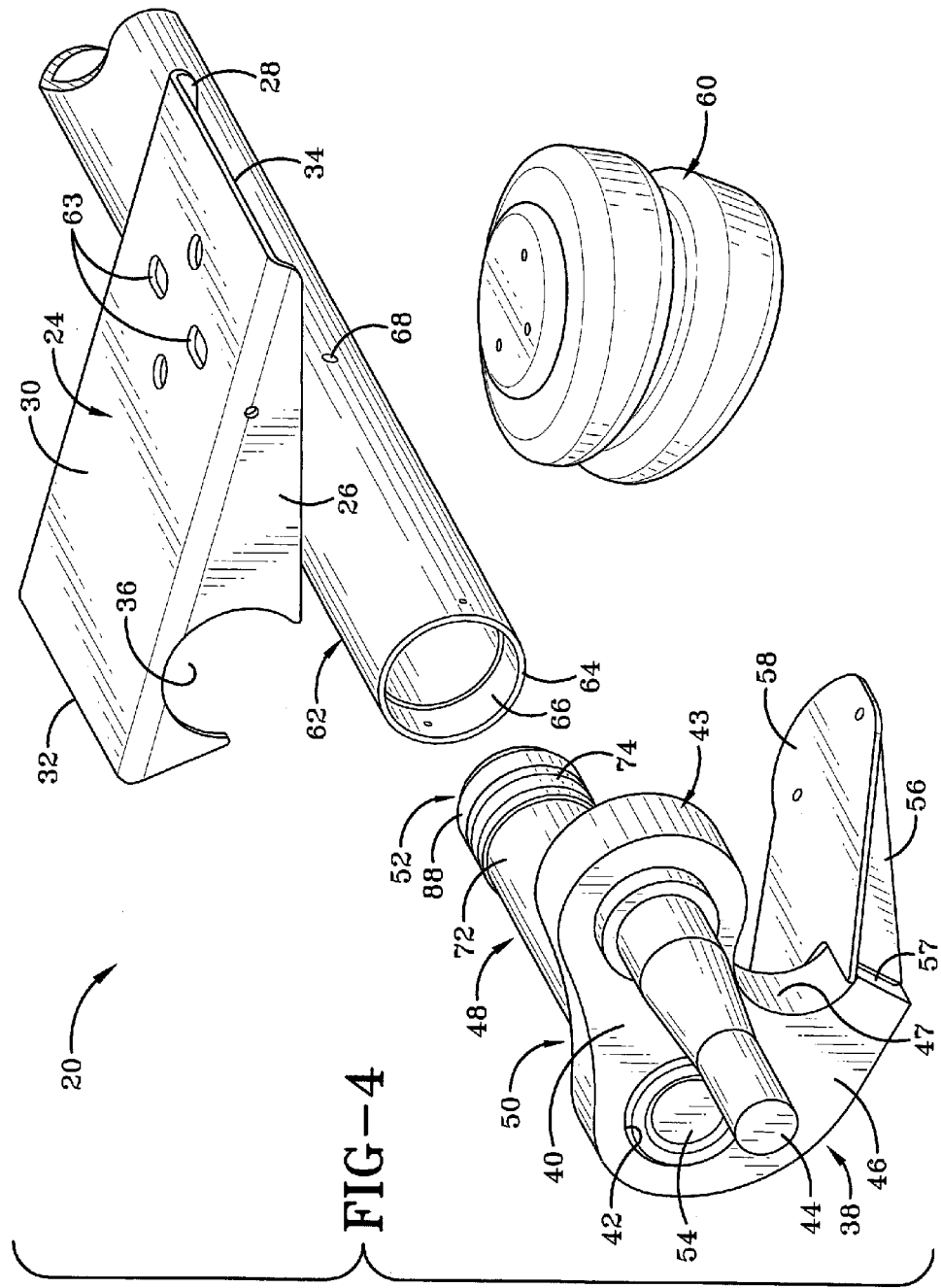
FIG. 4 is an exploded perspective view of the driver side of a preferred embodiment suspension system.

Referring to FIG. 4, suspension assembly 20 includes a frame mounting bracket 24 which is secured to frame rail 18 by a plurality of bolts, by welding, or another type of attachment known in the art. Bracket 24 preferably has a U-shaped channel with sidewalls 26 and 28 perpendicular to and on each side of a center wall 30. Sidewalls 26 and 28 decrease in height from a front end 32 to a back end 34 and include a circular-shaped opening 36 proximate front end 32. Opening 36 is arranged to receive and secure a control arm 38.

In accordance with one of the main features of the present invention, control arm 38 is generally arcuate in shape and includes a central body 40 with a cavity 42 extending through the front portion of the central body. The control arm also includes an upper rear portion 43 with a spindle 44 protruding from an outer surface 46 and arranged to support tire-wheel assembly 22. A rear surface 47, proximate and below upper rear portion 43, is preferably concave in shape with the bowl-shaped opening directed rearward. The generally concave shape of rear surface 47 is partially defined at the top by upper rear portion 43 and at the bottom by bottom rear portion 57 (described infra). Cavity 42 receives and supports a complimentary shaped internal tube assembly 48. Control arm 38 pivots at cavity 42 due to spindle 44 and cavity 42 being offset from one another.

In particular, internal tube assembly 48 has a first end 50 and a second end 52 with an overall length of approximately 19.75 inches in a preferred embodiment. First end 50 is fully inserted within cavity 42 such that the outer portion of first end 50 is generally flush with outer surface 46. A plug 54 is inserted at least partially into first end 50 and protects the inner diameter of internal tube assembly 48 as well the bearings and connections between control arm 38 and internal tube assembly 48.

Control arm 38 also includes a lower spring support 56 extending from a bottom rear portion 57 of the control arm. The lower spring support is preferably welded to the control arm at bottom rear portion 57. However, the lower spring support may also be arranged to be bolted to the control arm without departing from the spirit and scope of the invention. Lower spring support 56 has a spring mounting surface 58 proximate spindle 44. Advantageously, an air spring 60 is located on an axis similar to spindle 44 and permits full functional use of the air spring. In particular, the distance between the center of control arm cavity 42 and the center axis of air spring 60 is approximately 10 inches in a preferred embodiment, while the distance between the center of control arm cavity 42 and the center axis of spindle 44 is approximately 7.36 inches. Thus, the control arm is a compact component that locates the spindle axis very close to the air spring axis to provide superior dampening by using virtually the full range of motion of air spring 60.

An axle tube 62 extends from the driver side to the passenger side and is preferably a hollow tube that includes a first end 64 with a bearing surface 66. Axle tube 62 is intermediate the pair of cross tube assemblies 48 and arranged to accept second end 52 of the internal tube assembly. Cross tube 48 is coupled to axle tube 62 by welding 69 through weld windows 68 after the cross tube is fully seated within the axle tube, as particularly seen in FIG. 7.

While axle tube 62 is described as connecting the driver side and passenger side suspensions, the axle tube need not connect the driver side and passenger side suspensions. In particular, each suspension can be connected to a separate axle tube, which is in turn connected to the frame or other structurally sound component. While only one end of axle tube 62 has been described in detail, the second end is identical to first end 64 with respect to suspension system 20 of the passenger side, as should be apparent to one of ordinary skill in the art.

Figure 5:
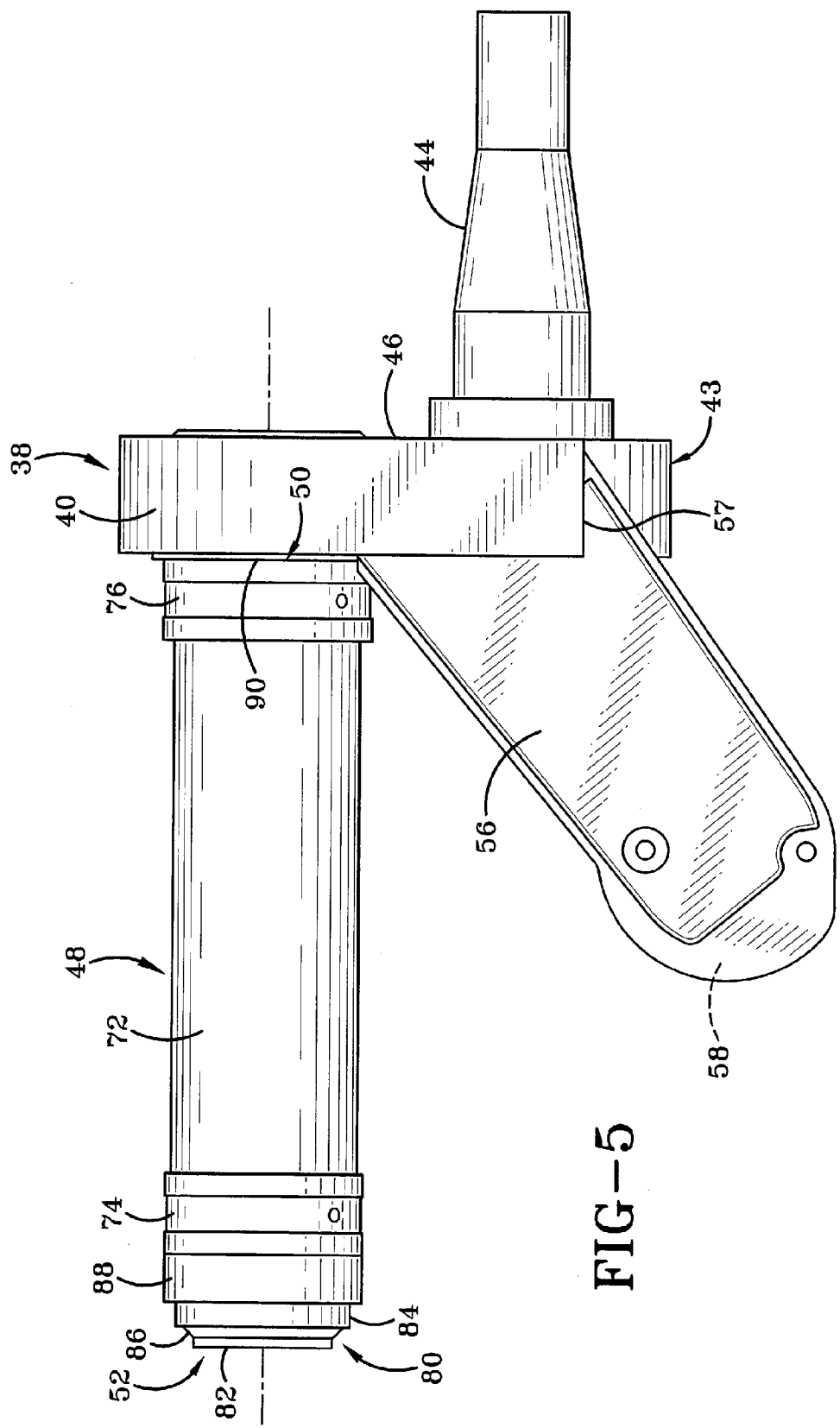
FIG. 5 is a bottom view of the driver side of a preferred embodiment suspension system.
Figure 6:
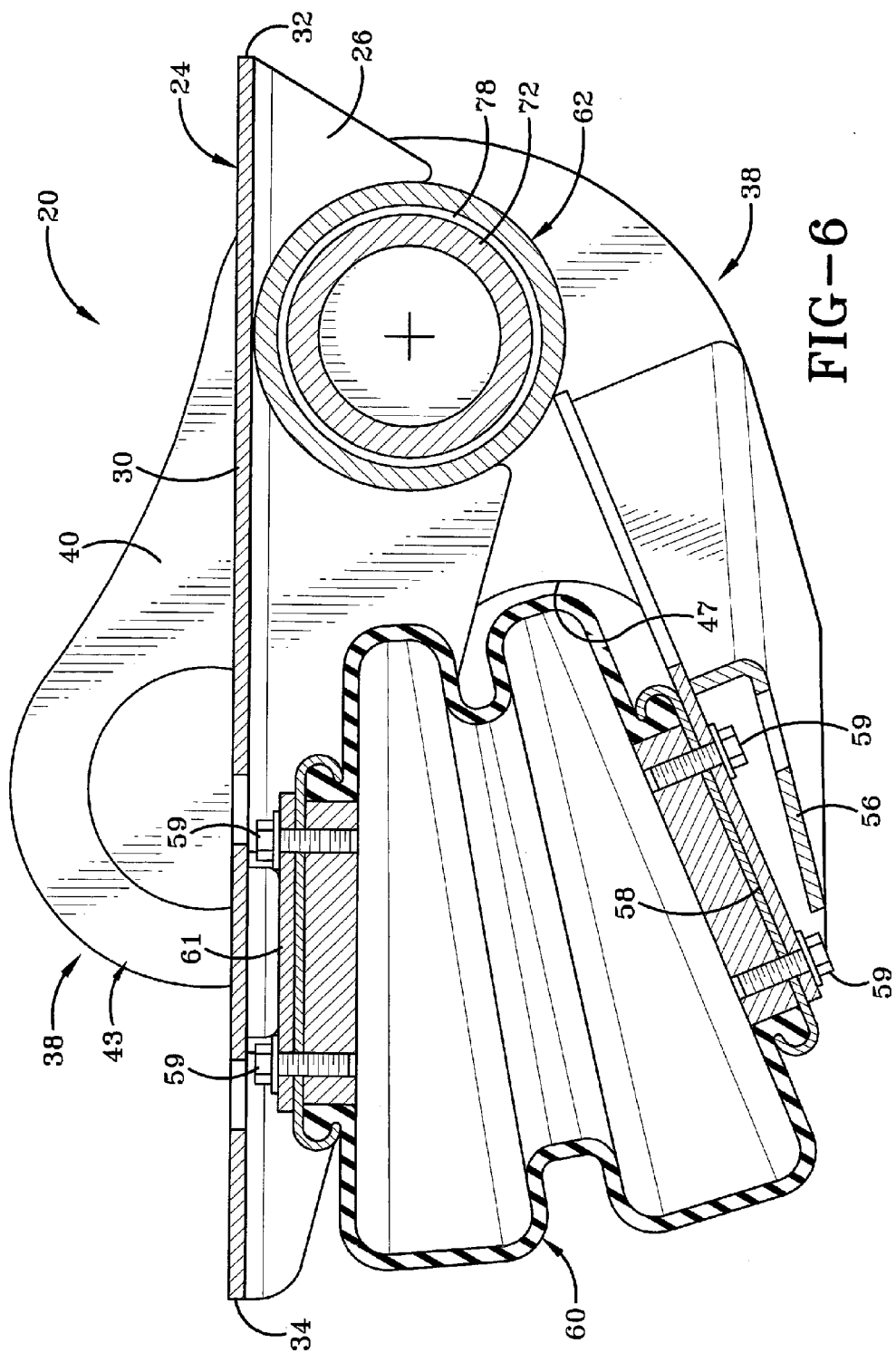
FIG. 6 is a cross-sectional view of the driver side of a preferred embodiment suspension system taken generally along line 6-6 in FIG. 3.

Averting to FIGS. 5 and 6, suspension system 20 is shown as a single integrated unit and separated from axle tube 62. Further, first end 50 of internal tube assembly 48 is shown press fit within cavity 42 of control arm 38. Although press fitting is the preferred fastening method, internal tube assembly 48 may also be welded or bolted to control arm 38, which is within the spirit and scope of the invention as claimed.

Figure 3:
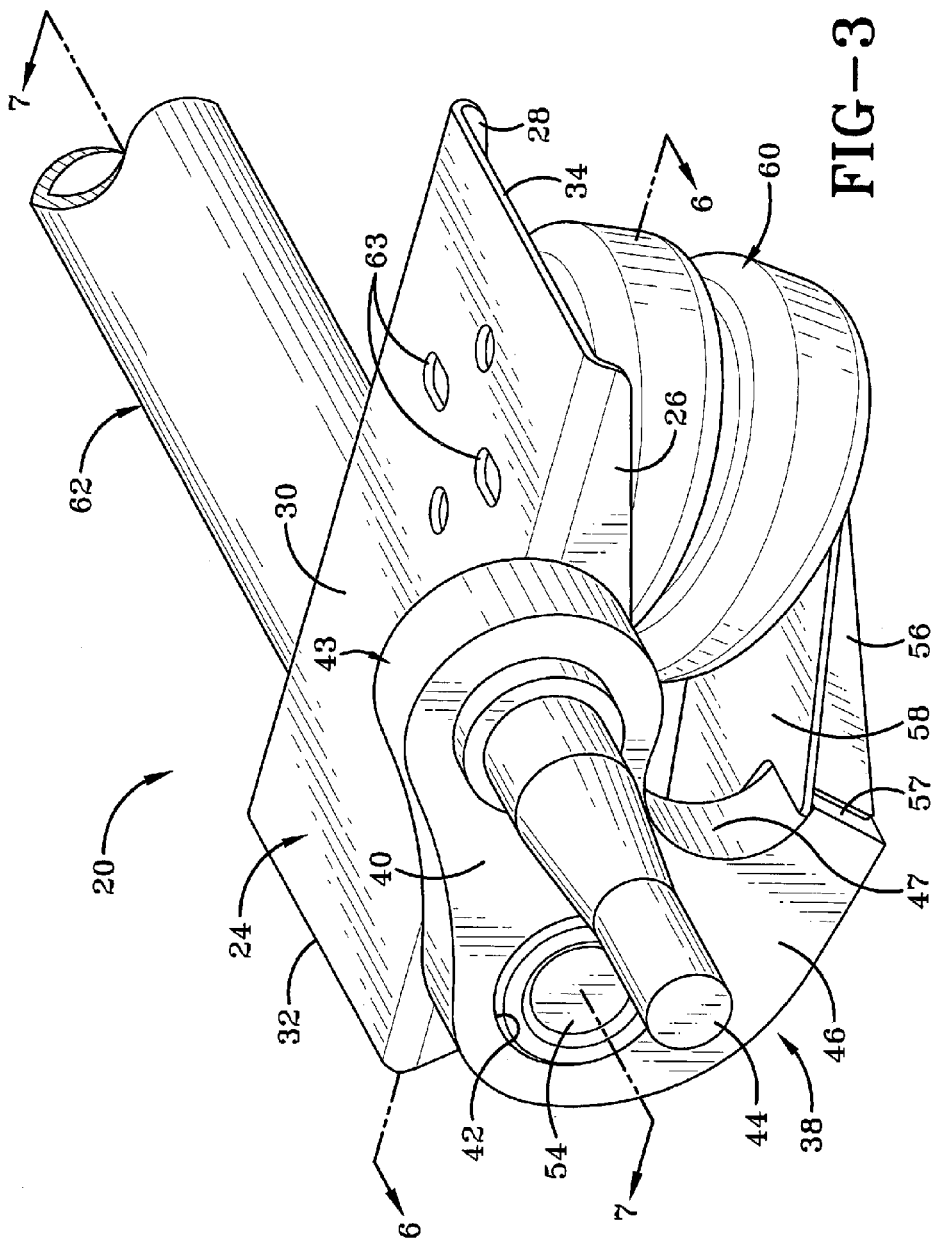
FIG. 3 is a perspective view of the driver side of a preferred embodiment suspension system.

Air spring 60 is located between the bottom side of frame mounting bracket 24 and spring mounting surface 58 of control arm 38. Preferably, the bottom of air spring 60 is bolted to mounting surface 58 with bolts 59 and the top of air spring 60 is bolted to plate 61 with another set of bolts 59. A plate 61 may be integral to frame mounting bracket 24, welded to bracket 24, or be secured with additional fasteners at slots 63 (FIG. 3). Air Spring 60 is preferably a heavy-duty unit, such as Goodyear Model 2B9-251 or similar air spring, although any suitable damping mechanism may be incorporated as should be immediately apparent to one of ordinary skill in the art.

Figure 7:
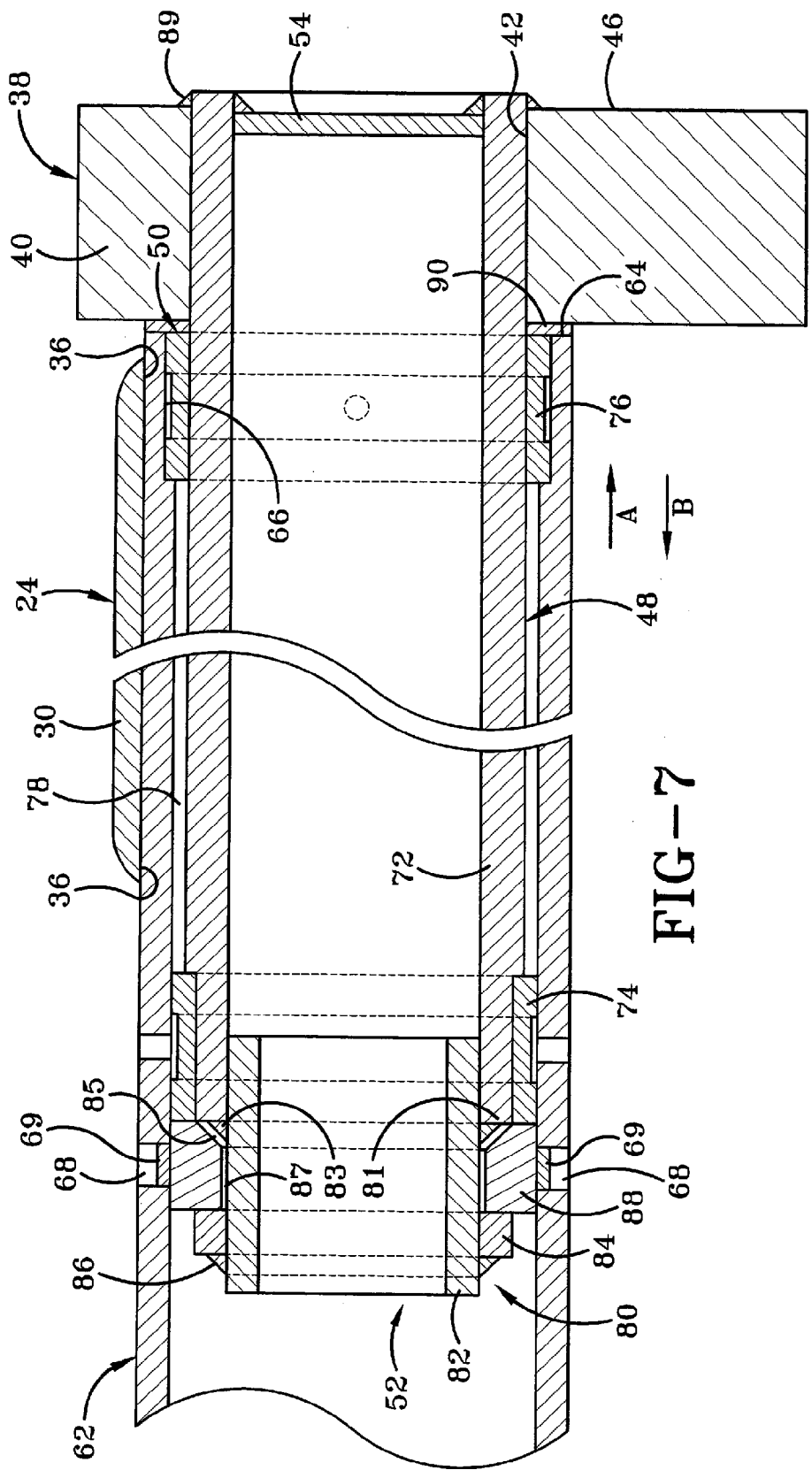
FIG. 7 is a cross-sectional view of the driver side of a preferred embodiment suspension system taken generally along line 7-7 in FIG. 3.

In accordance with another main feature of the present invention and referring to FIG. 7, internal tube assembly 48 includes an inner member 72 which is concentric with axle tube 62 when the internal tube assembly is installed within the axle tube. The cross tubes each have an inner bushing 74 proximate second end 52 and an outer bushing 76 proximate first end 50. Outer bushing 76 has a larger outer diameter than inner bushing 74 and outer bushing 76 is seated within a bushing surface 66 of axle tube 62 when internal tube assembly 48 is fully inserted within the axle tube. Inner bushing 74 has an outside diameter approximately equal to the inside diameter of axle tube 62 is generally located in a space 78 formed by the gap between axle tube 62 and inner member 72. Further, it is within the spirit and scope of the present invention to replace inner bushing 74 and outer bushing 76 with a pair of bearings.

A retainer assembly 80 includes an insert 82 which is welded to a first end 81 of inner member 72 indicated at 83. Next, an inner axle retainer 88 is slid onto the outer surface of the insert and located proximate first end 81. The inner axle retainer includes clearances 85 and 87. Clearance 85 is provided to allow room for weld 83, while clearance 87 is provided to allow rotation of inner member 72 and insert 82. After the inner axle retainer is located on insert 82, a stop 84 is slid onto the outer surface of the insert. The stop is then welded to the outer surface of the insert at 86 and prevents movement of the axle in the direction associated with arrow A. Insert 82 preferably has an outside diameter of approximately 3", but may be any appropriate size to slide within the inside diameter of inner member 72 and is arranged to assist in preventing axial movement of the inner member relative to cross tube 62.

Inner axle retainer 88 is then welded into place through weld window 68 at weld 69. Inner axle retainer 88 is thus axially and rotationally secured after being welded and thereby prevents axial or rotational movement of retainer assembly 80 due to the welding of the inner member and insert 82. Accordingly, retainer assembly 80 prevents axial movement of inner member 72 and control arm 38 in the directions indicated by arrows A and B while still permitting free rotational movement at bushings 74 and 76.

Axle tube 62 is axially spaced apart from control arm 38 by a washer 90 and connected to the control arm at a weld 89. Washer 90 is preferably a heavy-duty washer with an inside diameter slightly larger than the outside diameter of inner member 72 and an outside diameter approximately equal to the outside diameter of axle tube 62. Advantageously, washer 90 properly spaces axle tube 62 and outer bushing 76 axially apart from control arm 38 to allow inner member 72 and control arm 38 to spin freely with little resistance. While the preferred embodiment is described with an axle tube, it is within the spirit and scope of the present invention to provide a pair of control arms 38 spaced apart from and parallel to one another and mounted to frame rail 18.

Having described the structure of the present invention, a preferred method of operation will be described in detail and should be read in light of FIGS. 1 through 10.

Figure 8:
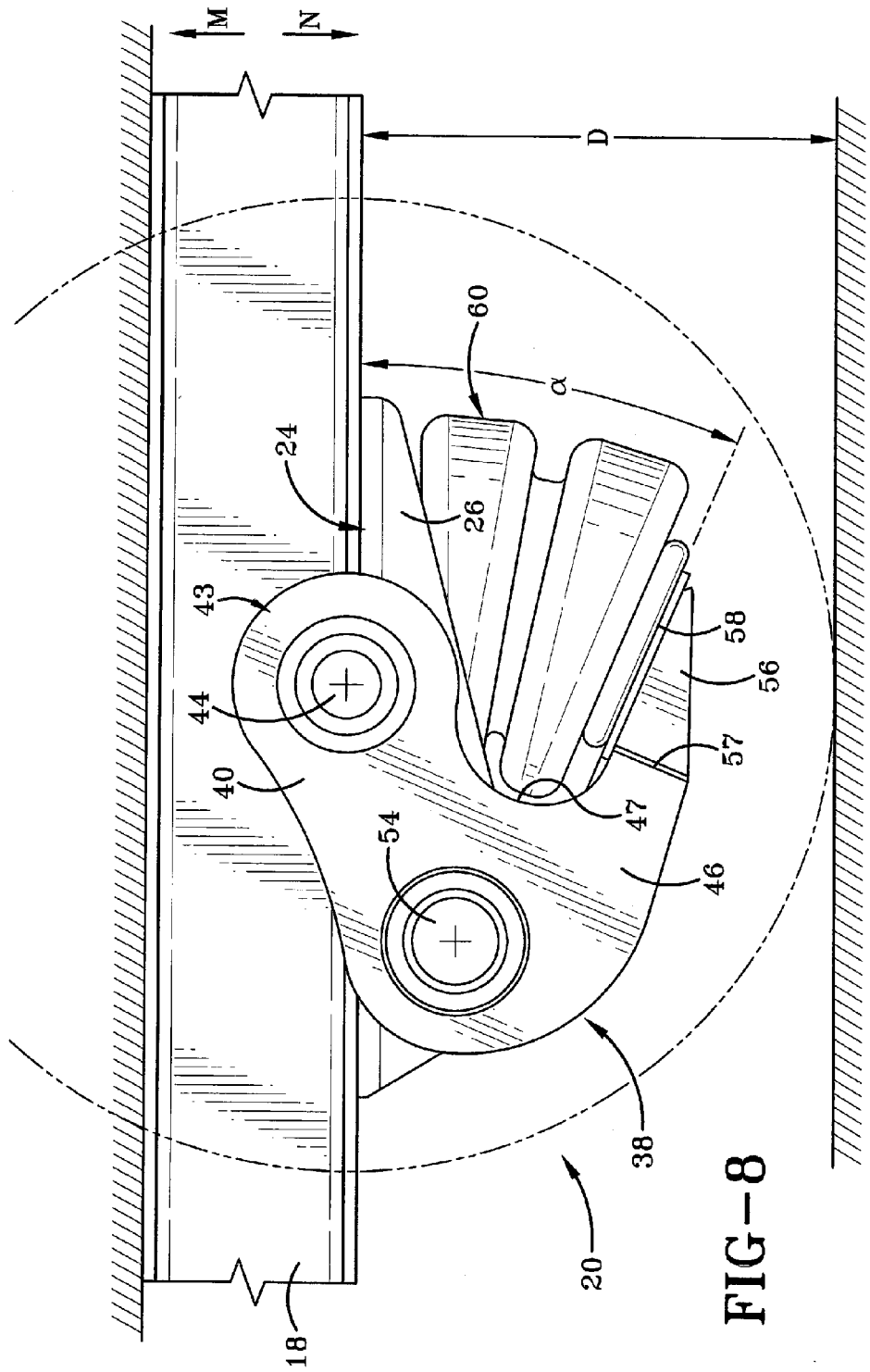
FIG. 8 is a side view of the driver side of a preferred embodiment suspension system in the design position.
Figure 9:
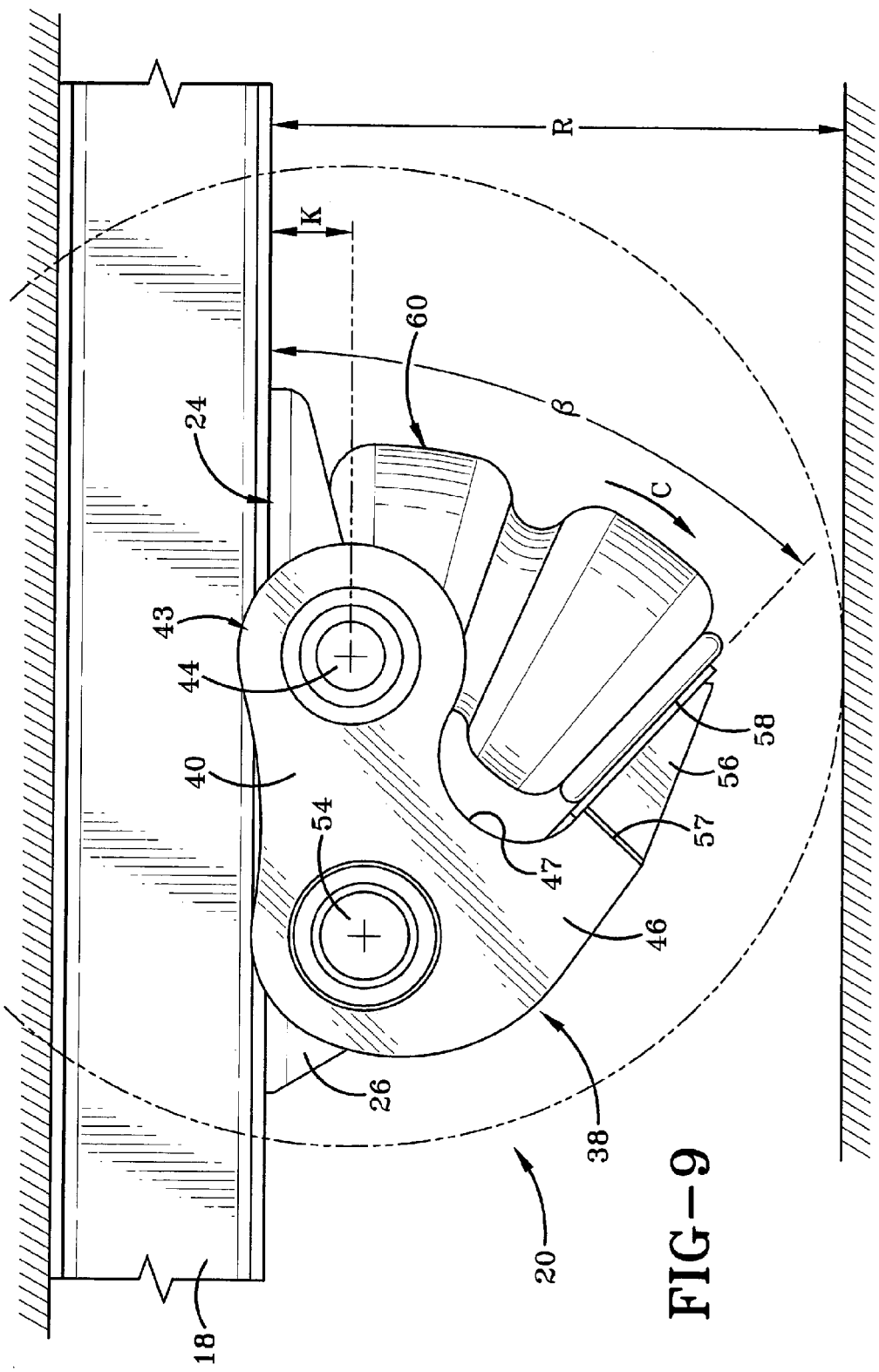
FIG. 9 is a side view of the driver side of a preferred embodiment suspension system in the rebound position; and, FIG. 10 is a side view of the driver side of a preferred embodiment suspension system in the jounce position.

FIG. 8 is a side view of suspension assembly 20 in the design position and also represents the state of the suspension when traveling down a smooth road without undulations. In a preferred embodiment, distance D is approximately 9.60 inches, while angle α is approximately 22.9°. FIG. 9 is a side view of suspension assembly 20 with air spring 60 fully extended in the rebound position when the suspension is fully decompressed. The rebound position occurs as spindle 44 travels vertically downward after encountering an undulation in the road surface or upon entering a pothole and spring mounting surface 58 moves downward in the direction of arrow C. In the full rebound position, distance R is approximately 12.70 inches, while angle β is approximately 43.0°.

Figure 10:
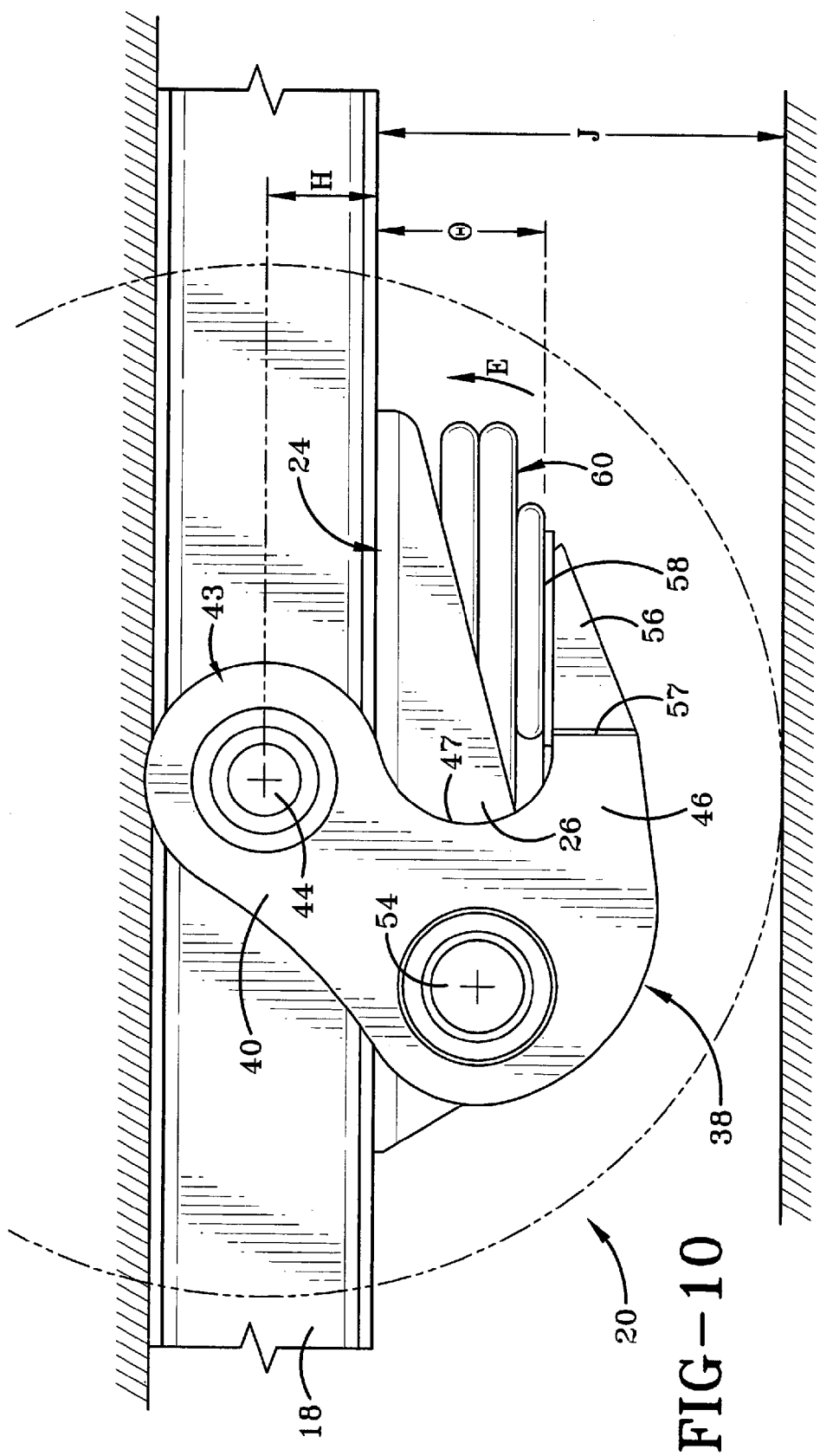
Figure 11:
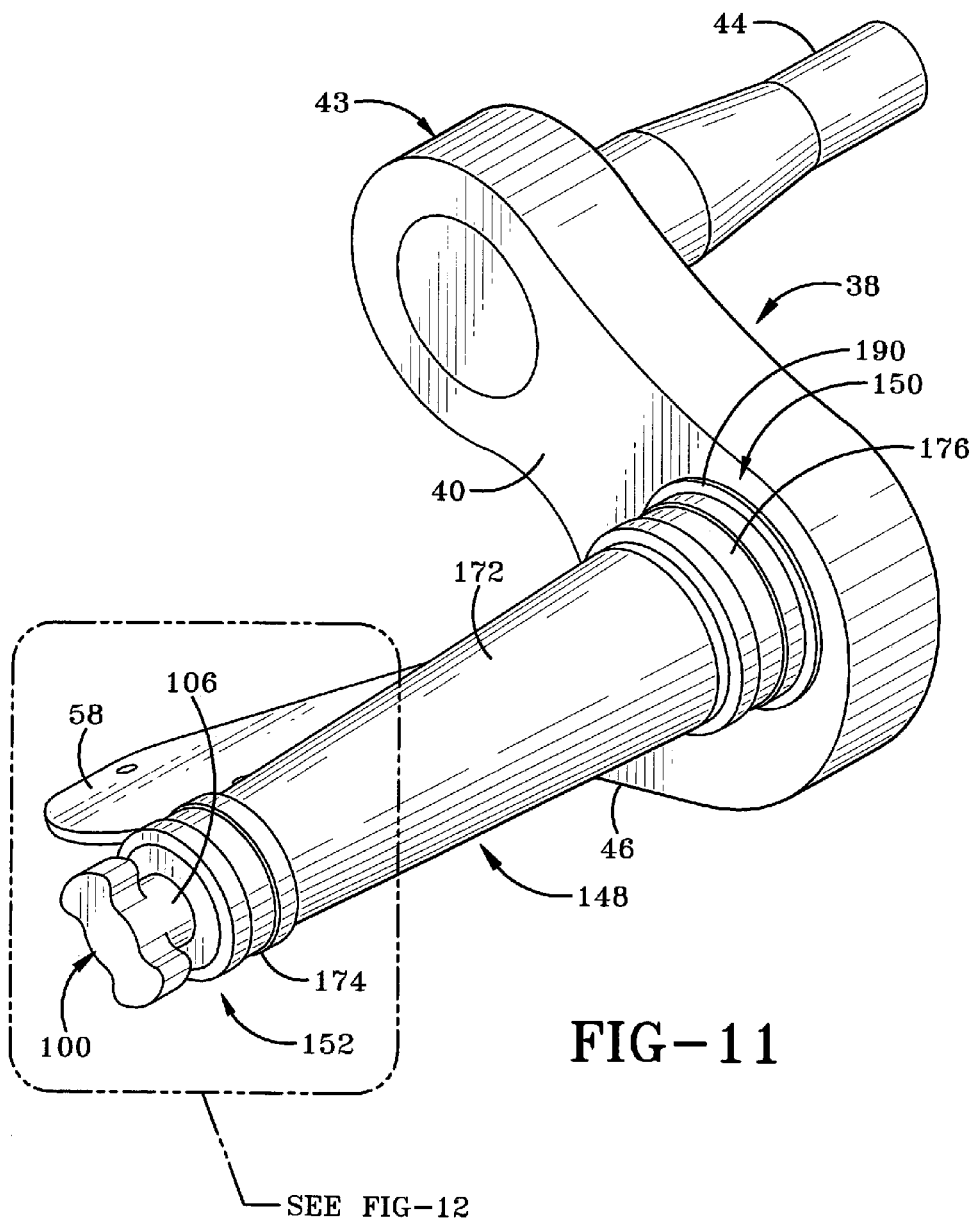
FIG. 11 is an example perspective view of a internal tube assembly with a locking structure.

FIG. 10 is a side view of suspension assembly 20 in the jounce position when the suspension is fully compressed. The jounce position occurs when spindle 44 moves vertically upward upon contacting an undulation in the road and the bottom of air spring 60 is forced upward by spring mounting surface 58 due to the rotational movement of control arm 38 in the direction of arrow E. In the jounce position, distance J is approximately 5.11 inches, while angle θ is equal to approximately zero degrees. Advantageously, spindle 44 of suspension system 20 has a jounce travel H approximately equal to 2.62 inches and a rebound travel K approximately equal to 2.72 inches. Thus the total travel of spindle 44 is 5.34 inches and 43° in a preferred embodiment.

Averting to FIG. 8, when spindle 44 is moved vertically in the directions associated with arrows M and N due to movement of the tire-assembly (not shown), control arm 38 is rotated at the pivot connection of internal tube assembly 48 and axle tube 62 due to the vertical spindle movement. Thus, when spindle 44 is moved in the direction of arrow N, a clockwise rotation is imparted on control arm 38. Further, when spindle 44 is moved in the direction of arrow M, a counter-clockwise rotation is imparted on control arm 38. Air spring 60 acts to dampen and reduce the effects of any rotational movement of control arm 38 and is particularly effective since the axis of spindle 44 is very close to the axis of air spring 60. In addition, the "C" shape of control arm 38 means that spring mounting surface 58 is horizontally spaced about the same distance from the pivot connection of internal tube assembly 48 and axle tube 62 as the air spring mounting position on frame mounting bracket 24. Therefore, air spring 60 is generally compressed about its vertical axis to improve the air spring life and efficiency.

In summary, suspension system 12 provides a trailing beam style suspension with fully independent wheel action and all the advantages known in the art, while still providing a suspension that is lightweight and compact. Each suspension assembly 20 operates such that as tire-wheel assemblies 22 move into and out of a ground engaging position, control arm 38 pivots independently from the opposing control arm. Thus, the need for a heavy torque arm, U-bolt frame connections, rubber strips, and rubber bushings, which add significant weight and unwanted compliance, have been eliminated, as well as the associated variations in tow and camber. Further, since suspension assembly 20 is a one-piece structure and bearings or bushings are located at the pivot points, hysteresis is virtually eliminated and allows frame rails 18 to be located closer to the ground while dramatically improving ride quality.

Accordingly, the suspension system is an effective, safe, inexpensive, and efficient device that achieves all the enumerated objectives of the invention, provides for eliminating difficulties encountered with prior art devices, systems, and methods, and solves problems and obtains new results in the art.

In a second configuration of the preferred embodiment, a suspension assembly 99 includes an internal tube assembly 148 with a first end 150 and a second end 152 as illustrated in FIGS. 11-20. Unlike the first configuration of the preferred embodiment, this internal tube assembly 148 is formed with a locking structure 100 with a uniquely shaped portion at the second end 152 of the internal tube assembly 148. A similarly shaped opening 102 can be formed in a locking plate 104 that is mounted inside the axle tube 162. The locking plate 104 can be mounted in the axle tube 162 by welding or in another suitable way.

Figure 16:
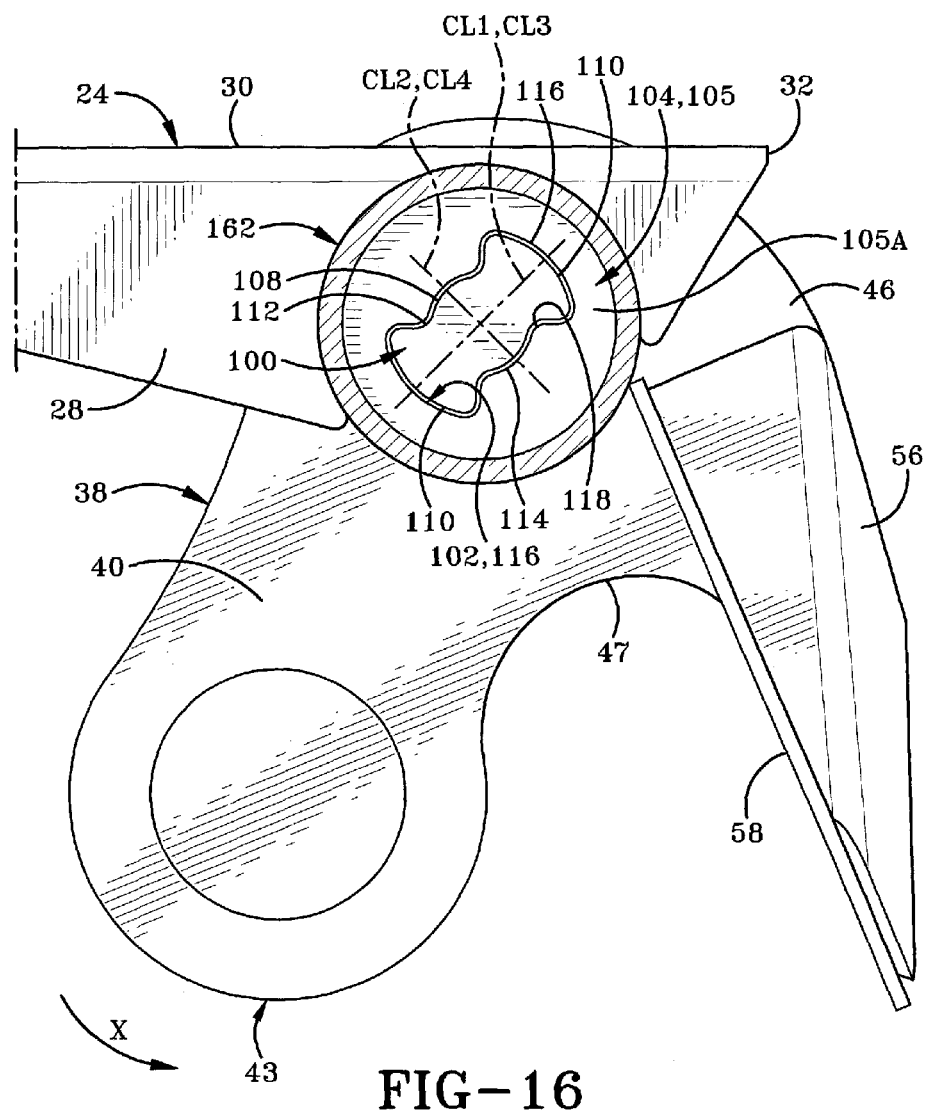
FIG. 16 is an example view of the internal tube assembly rotated for insertion of the locking structure into the axial tube.
Figure 17:
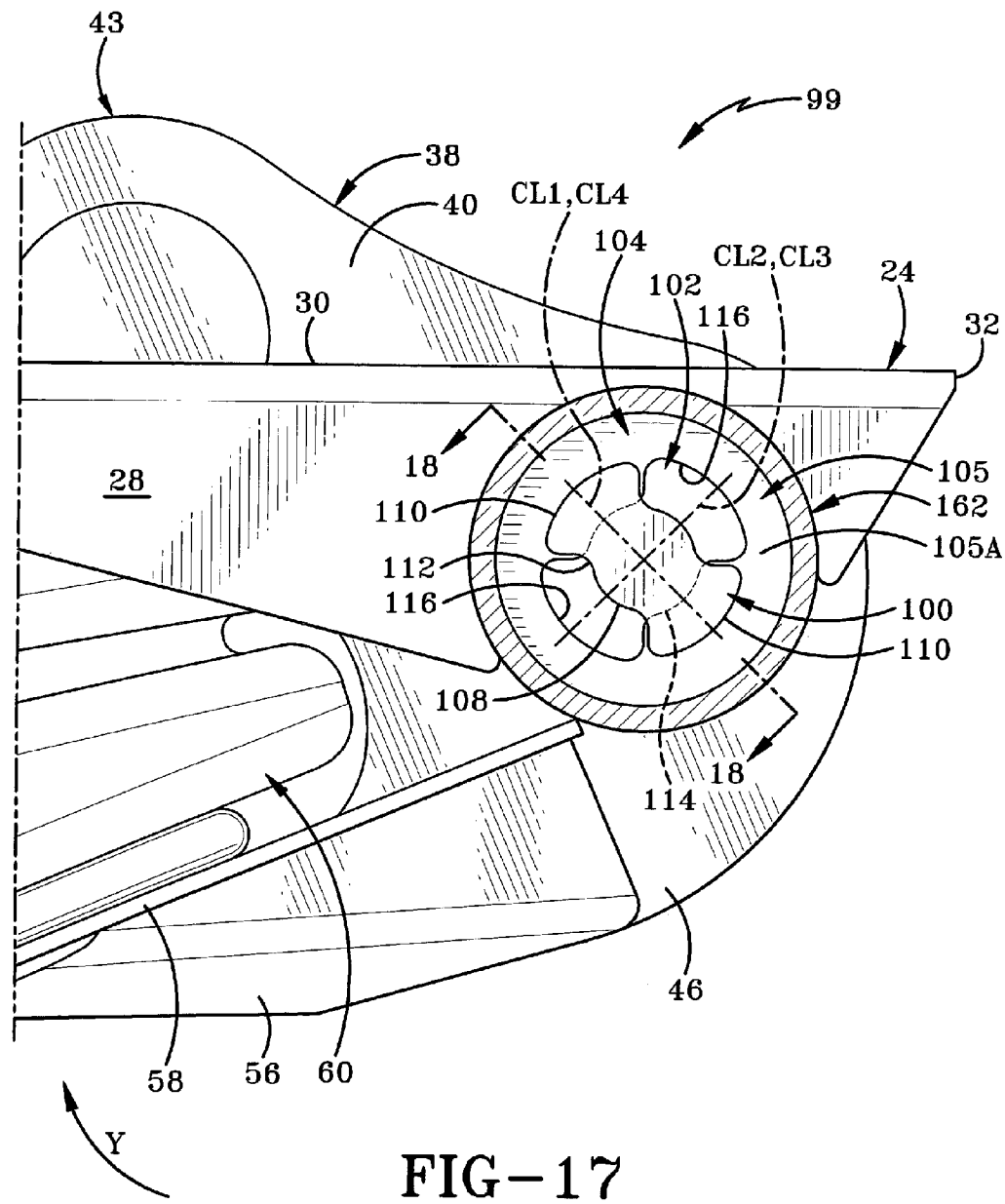
FIG. 17 is an example view of the internal tube assembly and its locking structure in the no load design position.

Because it is helpful in understanding the benefits of this configuration, its use is now briefly discussed before beginning to describe its details. To install the suspension 99 onto a vehicle the axle tube is first installed on the vehicle, preferably to the frame. Next, the internal tube assembly 148 is first rotated to an angle so that centerlines CL1 and CL2 (FIG. 12) of the locking structure 100 respectively align with center lines CL3 and CL4 (FIG. 13A) of the locking plate 104 as shown in FIG. 16. This aligns the orientation of the shape of the locking structure 100 that is uniquely shaped at the second end 152 to the similarly shaped opening 102 inside the axle tube 162. This allows the internal tube assembly 148 to be slid into the axle tube 162. Once fully inserted, the internal tube assembly 148 can be rotated to a standard operating or design position as shown in FIG. 17. The shape of the locking structure 100 and the similarly shaped opening 102 are now unaligned so that the internal tube assembly 148 cannot slide out of the axle tube 162. This is the case as long as the axle tube 162 rotates between normal jounce and rebound positions in normal operation of the suspension assembly 99. Only when the internal tube assembly 148 is rotated to very large angle can it be slid out of the axle tube 162. Thus, in normal operation, the shape of the locking structure 100 and the similarly shaped opening 102 in the locking plate 104 prevent the internal tube assembly 148 from siding out of the axle tube 162.

Figure 12:
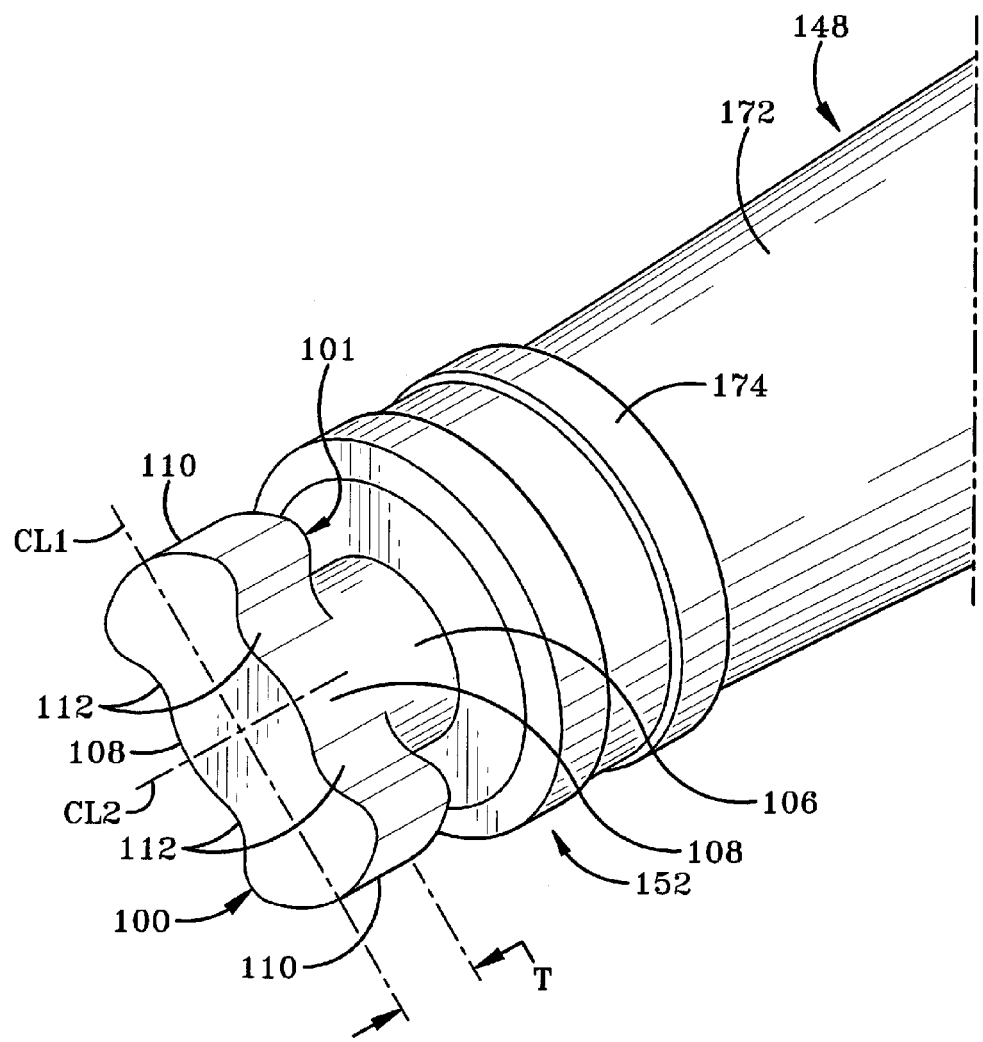
FIG. 12 is an example detailed view of the locking structure of the internal tube assembly of FIG. 11.

Returning now to a detailed description of this configuration the locking structure 100 is now described with reference to FIG. 12. The locking structure 100 is formed at the second end 152 of the internal tube assembly 148 projecting outward from that end on a cylindrical structure 106 and having a back surface 101 As shown, the cylindrical structure 106 does not extend beyond any perimeter edge of the locking structure 100. In the preferred embodiment, the locking structure 100 extends from the cylindrical structure 106 as a planer structure that has a thickness of "T". Four concave surfaces 112 are formed at transitions between the inner convex surfaces 108 and outer convex surfaces 110. Inner convex surfaces 108 can have a curvature that is the same curvature as the outer surface of the cylindrical structure 106. In this configuration, the locking structure 100 is a symmetrical bow-tie shape with two inner convex surfaces (curves) 108 and two outer convex surfaces 110. The locking structure 100 is symmetrical about centerline CL1 as well as centerline CL2. Even though this second configuration of the preferred embodiment is shown with two symmetrical center lines CL1 and CL2, one of ordinary skill in the art would appreciate that the locking structure 100 and the opening 102 could be uniquely shaped so that they are not symmetrical about any axis and may only fit together when rotated to single position. Even though the locking member has been shown and discussed as a generally "butterfly" type of shape, it can be ANY other appropriate shape.

As shown in FIGS. 13 and 13A, the complementary opening 102 of the locking plate 104 is formed with surfaces/curves complementary to the curves of the locking structure 100. The locking plate 104 has a front wall 105 with a front surface 105A and an annular wall 107 can extend outward from the locking plate 104. The opening 102 is formed with two lower concave surfaces 114 and two upper concave surfaces 116. The lower concave surfaces 114 generally trace out partial circumferences of a rotational diameter of a circle. Four convex surfaces 118 are formed between the lower concave surfaces 114 and two upper concave surfaces 116.

The internal tube assembly 148 includes a tapered inner member 172 which is concentric with axle tube 162 when the internal tube assembly 148 is installed within the axle tube 162. Similar to the cross tube 48 discussed above, the internal tube assembly 148 can have an inner bushing 174 near the second end 152 and an outer bushing 176 near the first end 150. The outer bushing 176 has a larger outer diameter than inner bushing 174. The inner bushing 174 has an outside diameter approximately equal to the inside diameter of axle tube 162 and is generally located in a space formed by the gap between the axle tube 162 and the inner member 172. Further, it is within the spirit and scope of the present invention to replace inner bushing 174 and outer bushing 176 with a pair of bearings or another device as understood by those of ordinary skill in this art.

In some configurations, the axle tube 162 is axially spaced apart from a control arm 38 by a washer 190. The washer 190 is preferably a heavy-duty washer with an inside diameter slightly larger than the outside diameter of inner member 172 and an outside diameter approximately equal to the outside diameter of axle tube 162. Preferably, the washer 190 properly spaces the axle tube 162 and the outer bushing 176 axially apart from the control arm 38 to allow inner member 172 and control arm 38 to spin freely with little resistance. While the preferred embodiment is described with an axle tube 162, it is within the spirit and scope of the present invention to provide a pair of control arms 38 spaced apart from each other and that can be parallel to one another and mounted to frame rail 18.

Now that the components of the second configuration have been described, their use is now described further in more detail. As previously mentioned, the internal tube assembly 148 can be installed onto a vehicle by first rotating it until it is angled so that center lines CL1 and CL2 (FIG. 12) of the locking structure 100 respectively align with center lines CL3 and CL4 (FIG. 13A) of the locking plate 104 as shown in FIG. 16. This aligns the orientation of the shape of the locking structure 100 that is uniquely shaped at the second end 152 to the similarly shaped opening 102 inside the axle tube 162. This allows the internal tube assembly 148 to be slid into the axle tube 162. Once fully inserted, the internal tube assembly 148 can be rotated to a standard operating position or a design position. The shape of the locking structure 100 and the similarly shaped opening 102 are now unaligned so that the internal tube assembly 148 cannot slide out of the axle tube 162. In the locked position the back surface 101 of the locking structure 100 can be pressing against the front surface 105A of locking plate 104.

Figure 19:
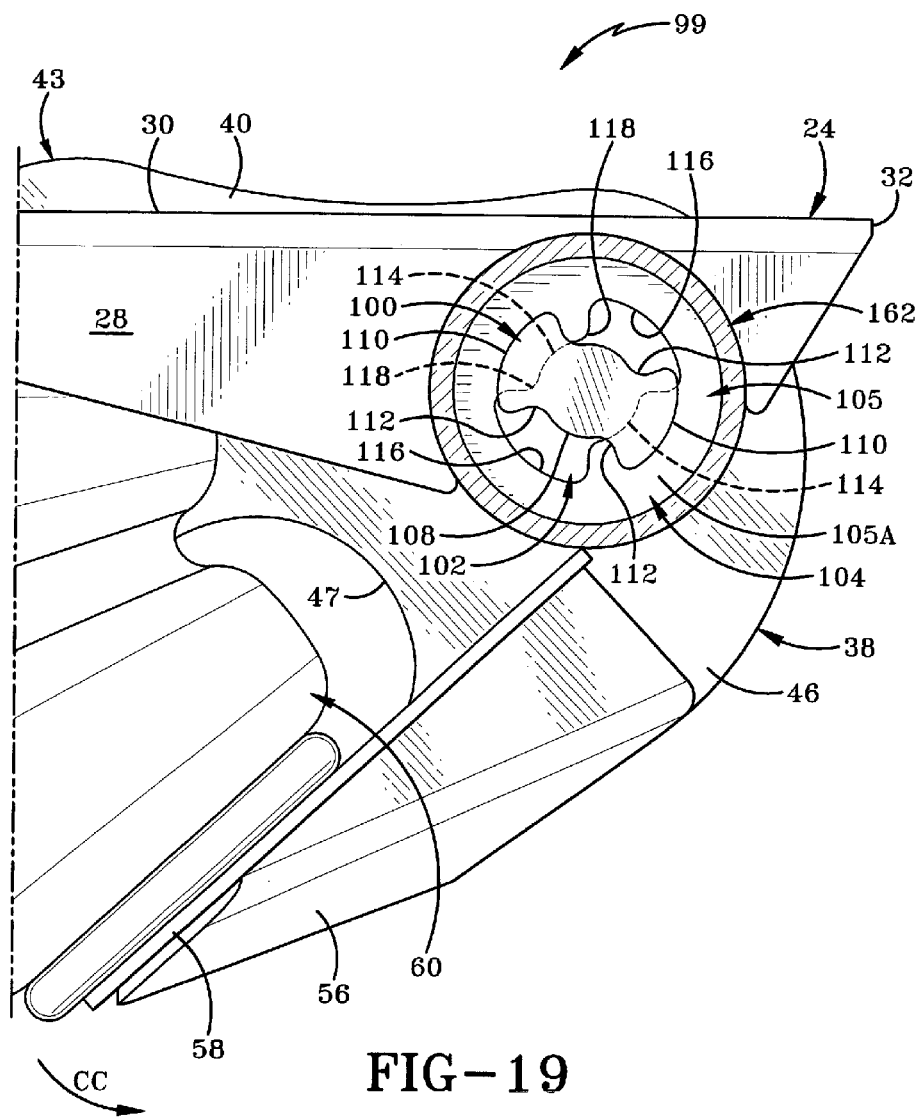
FIG. 19 is an example view of the internal tube assembly and its locking structure in the jounce position.
Figure 20:
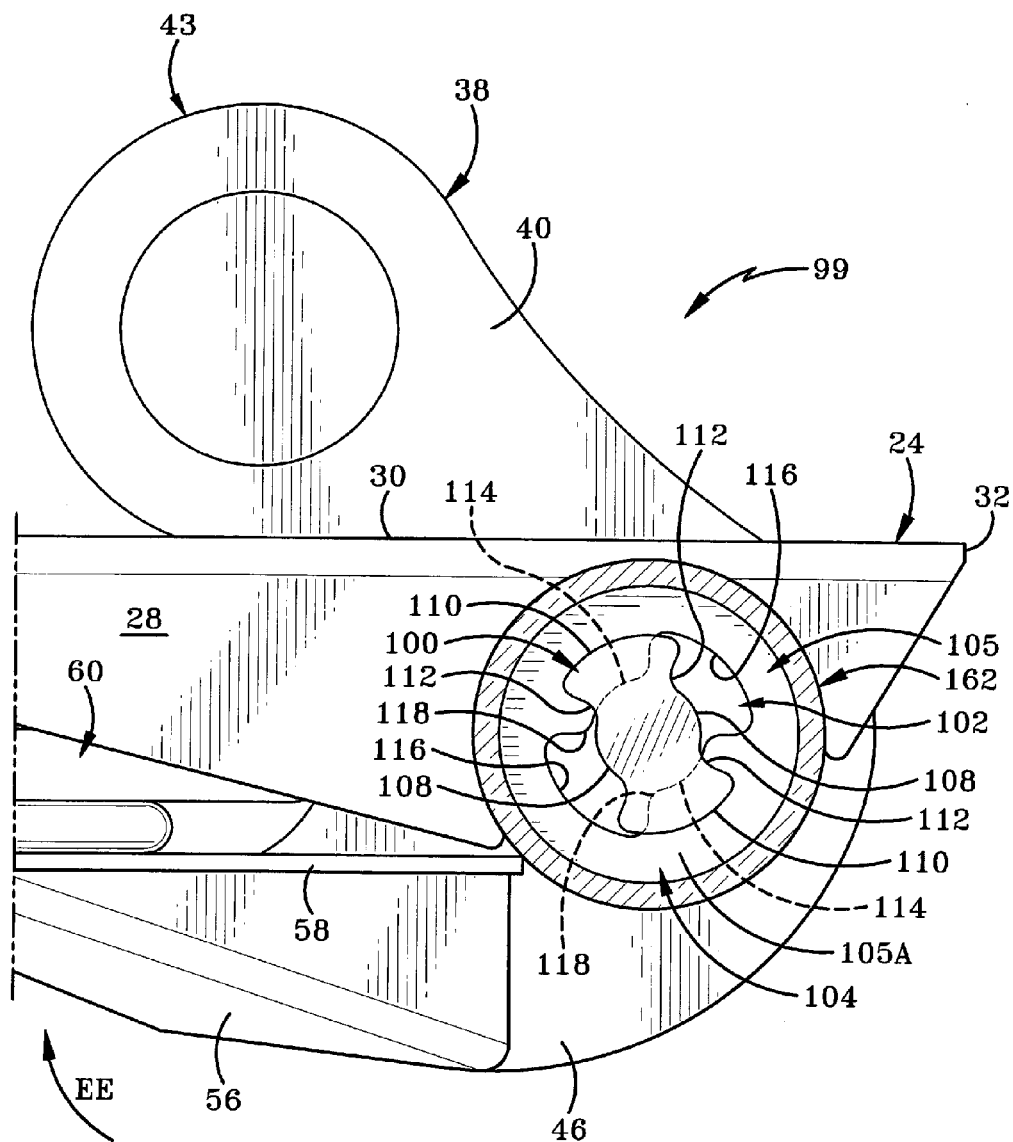
FIG. 20 is an example view of the internal tube assembly and its locking structure in the rebound position.

As shown in FIG. 19, when the suspension assembly 99 encounters a decrease in elevation (e.g., rolls over hole) it begins to move from design position to a jounce position. At that time, the inner member 172 of the internal tube assembly 148 is rotated, however, even in the full jounce position (as illustrated in FIG. 19) at least some of the back surface 101 of the locking structure 100 is lined up with and possibly pressing against the front surface 105A of locking plate 104 preventing the internal tube assembly's 148 removal from the axle tube 162. After passing over the hole or when encountering a bump that the vehicle is traveling over, the suspension assembly 99 can move to a rebound position as illustrated in FIG. 20 as a full rebound. In this position, the inner member 172 is again rotated, however, again some of the back surface 101 of the locking structure 100 is still lined up with and possibly pressing against the front surface 105A of locking plate 104 preventing the internal tube assembly's 148 removal from the axle tube 162. As the internal tube assembly 148 is rotated from the design position, to and from the jounce and/or rebound positions, the cylindrical structure 106 rotates back and forth within the rotational diameter formed by the lower concave surfaces 114 of the locking plate 104.

Figure 18:
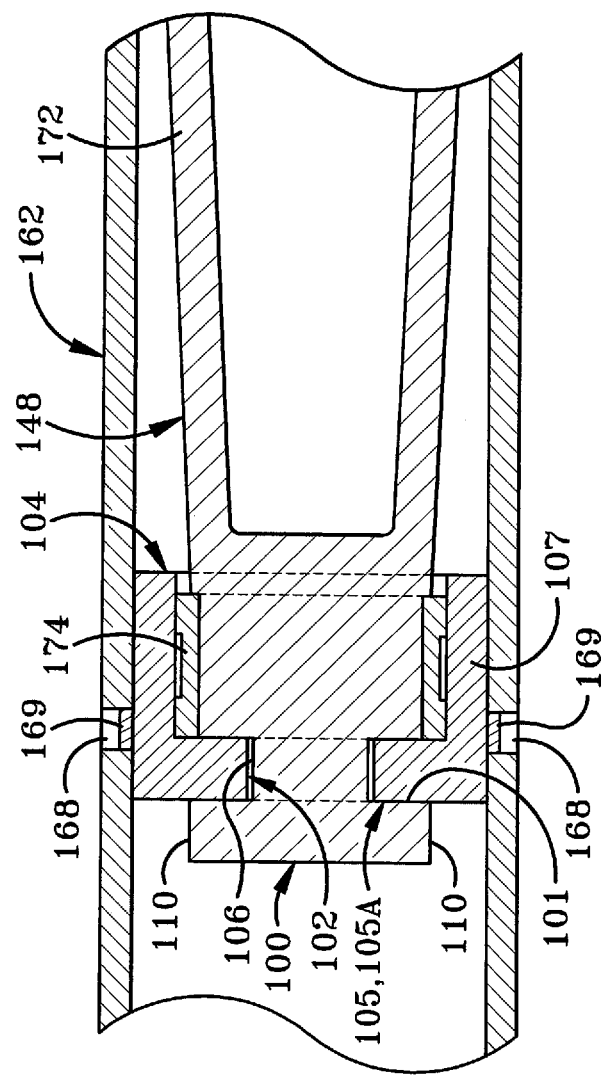
FIG. 18 is an example partial cross-sectional view of the internal tube assembly and the locking structure locked into the axial tube.

In summary, as illustrated by FIGS. 17, 18 and 19, the locking structure 100 and the similarly shaped opening 102 in the locking plate 104 are never aligned during normal operation to allow the internal tube assembly 148 to slide out of the axle tube 162. Only when the internal tube assembly 148 is first rotated to an angle so that center lines CL1 and CL2 (FIG. 12) of the locking structure 100 respectively align with center lines CL3 and CL4 (FIG. 13A) of the locking plate 104 (as shown in FIG. 16) can the internal tube assembly 148 possibly slide out of the axle tube 162. This position (and its 180 degree mirrored version) aligns the orientation of the shape of the locking structure 100 that is uniquely shaped at the second end 152 to the similarly shaped opening 102 inside the axle tube 162. This provides for easy installation of the suspension assembly 99 and an additional measure of safety ensuring that the internal tube assembly 148 is properly installed because it can only be inserted into the axle tube 162 in one operational position. Additional safety is also provided because the locking structure 100 prevents removal of the internal tube assembly 148 during normal operation.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the suspension system is constructed and used, the characteristics of the construction, and the advantageous new and useful results obtained; the new and useful structures, devices, elements, arrangement, parts, and combinations are set forth in the appended claims.

What is claimed is:

1. A suspension system for use with a vehicle comprising:
   an axle tube adapted to be attached to the vehicle;
   an internal tube assembly including an inner member with a first end and a second end, wherein the second end further comprises;
   a locking structure formed integrally with the inner member with a locking shape adapted to allow the internal tube assembly to be inserted into the axle tube when the locking structure is rotated to at least one non-operational position and, wherein the internal tube assembly is prevented from being removed from the axle tube when the internal tube assembly pivots between jounce and rebound positions when the suspension system is in operation.

2. A suspension system for use with a vehicle comprising:
   an axle tube adapted to be attached to the vehicle;
   an internal tube assembly including an inner member with a first end and a second end, wherein the second end further comprises;
   a locking structure formed integrally with the inner member with a locking shape adapted to allow the internal tube assembly to be inserted into the axle tube when the locking structure is rotated to at least one nonoperational position and, wherein the internal tube assembly is prevented from being removed from the axle tube when the internal tube assembly pivots between jounce and rebound positions when the suspension system is in operation;
   a control arm having an upper arm and a lower arm, wherein the lower arm is attached to the first end of the inner member of the internal tube assembly; and
   a spindle extending outwardly from the upper arm.

3. The suspension system of claim 2 wherein the locking structure is bow-tie shaped.

4. The suspension system of claim 2 wherein the locking structure extends outward from the second end of the inner member.

5. The suspension system of claim 2 further comprising:
   a cylindrical structure between the locking structure and the inner member.

6. The suspension system of claim 5 further comprising:
   a diameter of the cylindrical structure that does not extend beyond any perimeter edge of the locking structure.

7. The suspension system of claim 2 wherein the axle tube further comprises:
   a locking plate with an opening complementary to the locking shape and adapted to allow the locking structure to pass through the opening allowing the internal tube assembly to be inserted into the axle tube when the locking structure is rotated to the at least one non-operational position.

8. The suspension system of claim 7 wherein the locking plate further comprises:
   at least one lower concave surface forming at least part of a circumference of a circle, wherein a cylindrical structure between the locking structure and the inner member is adapted to pivot within the circle.

9. The suspension system of claim 8 wherein the locking structure is symmetrical about at least one axis.

10. The suspension system of claim 7 wherein the locking plate is generally a planer plate having a first thickness.

11. The suspension system of claim 2 wherein the axle tube further comprises:
    an opening complementary in shape to the locking shape of the locking structure, wherein the opening is adapted to receive at least a portion of the locking structure when the locking structure is rotated to at least one non-operational position.

12. The suspension system of claim 11 further comprising:
    at least one lower surface of the opening of the axle tube forms at least part of a circumference of a circle, wherein a cylindrical structure between the locking structure and the inner member is adapted to pivot within the circle when the suspension system pivots between jounce and rebound positions.

13. The suspension system of claim 2 wherein at least one nonoperational position includes a first position and a second position rotated about 180 degrees from the first position.

14. The suspension system of claim 2 wherein the control arm further comprises:
    a spring plate; and
    an air spring adapted to be mounted intermediate the spring plate and the vehicle.

15. The suspension system of claim 2 wherein the axle tube extends across the vehicle and the internal tube assembly is a first internal tube assembly wherein the suspension system further comprises:
    a second internal tube assembly adapted to be mounted in the axle tube at an end of the axle tube opposite the first internal tube assembly.

16. A method of mounting a suspension assembly to a vehicle comprising:
    mounting an axle tube to a vehicle;
    pivoting an internal tube assembly to an install position that is outside of a range of between full jounce and full rebound positions of the internal tube assembly when the suspension assembly is in operation on the vehicle, wherein when the internal tube assembly is in the install position a locking structure on the internal tube assembly lines up with a complementary opening in the axle tube;

sliding the internal tube assembly into the axle tube including sliding the locking structure through the opening in the axle tube; and rotating the internal tube assembly to an operational position, wherein when the internal tube assembly is not rotated to the install position the internal tube assembly cannot be withdrawn from the axle tube.

17. A suspension assembly adapted to be retrofitted to a vehicle comprising:

a mounting structure configured to be mounted onto the vehicle;

a pivot structure adapted to be rotated to an install position that is outside of a range between full jounce and full rebound positions of the pivot structure, wherein the pivot structure is adapted to slide into an opening in the mounting structure when in the install position, wherein when the pivot structure is installed in the mounting structure and in the range of operational positions the mounting structure is adapted to prevent the pivot structure from being removed from the mounting structure.

18. The suspension assembly of claim 17 wherein the pivot structure further comprises:

an elongated inner member with first and second ends;

a locking structure at the second end of the inner member shaped to pass through the opening in the mounting structure when in the install position.

19. The suspension assembly of claim 18 wherein the mounting structure further comprises:

a plate with the opening, wherein the plate is adapted to prevent the locking structure from passing through the opening when the pivot structure is not in the install position.

20. The suspension assembly of claim 19 wherein the plate further comprises:

at least one wall with an edge forming at least a portion of a circular portion of the opening, and wherein the inner member is adapted to pivot within the circular portion of the opening.

* * * * *